(12) United States Patent
Hsiao (10) Patent No.: US 9,170,937 B2
(45) Date of Patent: Oct. 27, 2015

(54) DATA STORAGE DEVICE AND OPERATING METHOD FOR FLASH MEMORY

(71) Applicant: Silicon Motion, Inc., Jhubei, Hsinchu County (TW)

(72) Inventor: Li-Shuo Hsiao, Chiayi (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 220 days.

(21) Appl. No.: 13/933,306

(22) Filed: Jul. 2, 2013

(65) Prior Publication Data

US 2014/0013038 A1    Jan. 9, 2014

(30) Foreign Application Priority Data

Jul. 5, 2012  (TW) .............................. 101124173 A (51) Int. Cl.
*G06F 12/02*        (2006.01)

(52) U.S. Cl.
CPC .................................. *G06F 12/0246* (2013.01)

(58) Field of Classification Search
None
See application file for complete search history.

(56) References Cited

U.S. PATENT DOCUMENTS

| | | | |
|---|---|---|---|
| 8,037,233 | B2 | 10/2011 | Pua et al. |
| 8,510,637 | B2 | 8/2013 | Tseng et al. |
| 2009/0024899 | A1* | 1/2009 | Reid .............................. 714/758 |
| 2010/0122022 | A1* | 5/2010 | Luo et al. ...................... 711/103 |
| 2013/0042051 | A1* | 2/2013 | Huang et al. .................. 711/103 |

FOREIGN PATENT DOCUMENTS

| | | |
|---|---|---|
| TW | 200643961 | 12/2006 |
| TW | 200935423 | 8/2009 |
| TW | 201214454 | 4/2012 |

OTHER PUBLICATIONS

English language translation of abstract of TW 200643961 (published Dec. 16, 2006).
English language translation of abstract of TW 200935423 (published Aug. 16, 2009).
English language translation of abstract of TW 201214454 (published Apr. 1, 2012).

* cited by examiner

*Primary Examiner* — Gary Portka
(74) *Attorney, Agent, or Firm* — McClure & Qualey & Rodack, LLP (57) ABSTRACT

A data storage device and an operating method for a FLASH memory are disclosed. The disclosed data storage device includes a FLASH memory and a controller. The FLASH memory provides a storage space which is stored with a first storage type system information and a second storage type system information. Data recognition for the first storage type system information is stricter than that of the second storage type information. The controller reads the storage space of the FLASH memory and performs an error checking and correction process on data read from the storage space, and, based on the storage type system information, among the first and second storage type information, which first passes the error checking and correction process, the controller operates the FLASH memory.

6 Claims, 6 Drawing Sheets

DATA STORAGE DEVICE AND OPERATING METHOD FOR FLASH MEMORY

CROSS REFERENCE TO RELATED APPLICATIONS

This Application claims priority of Taiwan Patent Application No. 101124173, filed on Jul. 5, 2012, the entirety of which is incorporated by reference herein.

BACKGROUND OF THE INVENTION

1. Field of the Invention

The present invention relates to data storage devices, and in particular, relates to operating methods for FLASH memories.

2. Description of the Related Art

A FLASH memory is a common non-volatile memory, which is erased and programmed electrically. In common embodiments, the storage cells of a FLASH memory are implemented by NAND gates.

Figure 1A:
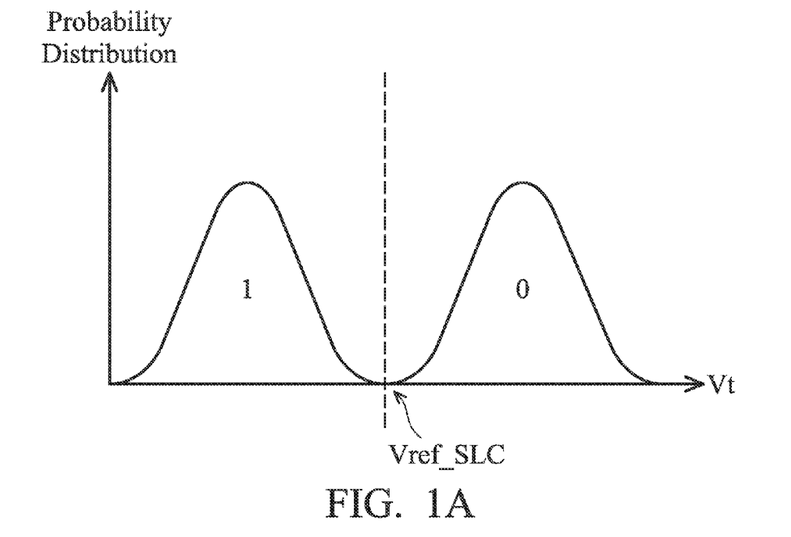
FIG. 1A shows the probability distribution of the different states of an SLC, along a voltage axis.
Figure 1B:
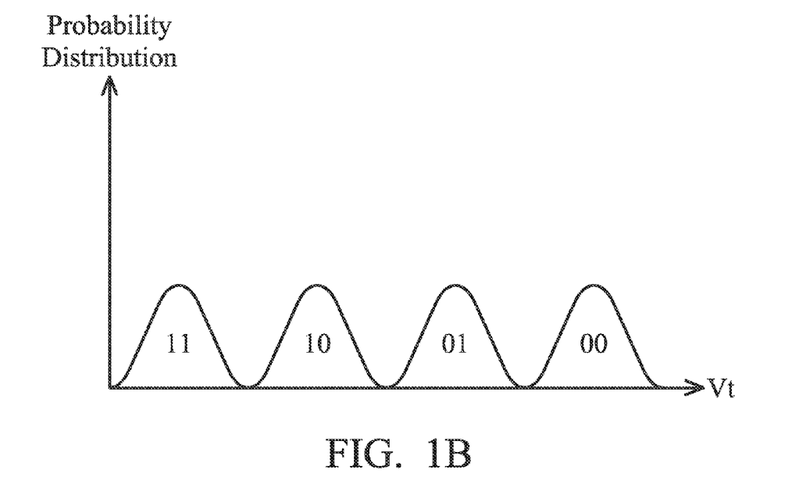
FIG. 1B shows the probability distribution of the different states of an MLC, along a voltage axis.

A storage cell operated by a read/write circuit of a FLASH memory may just correspond to a single bit (i.e., an SLC, abbreviated from a Single-Level Cell) or correspond to multiple bits (i.e., an MLC, abbreviated from a Multi-Level Cell). FIG. 1A shows the probability distribution of the different states of an SLC, along a voltage axis. FIG. 1B shows the probability distribution of the different states of an MLC, along a voltage axis.

Referring to FIG. 1A, for an SLC, a voltage reference Vref_SLC is adopted to recognize a value '0' and value '1'.

Figure 1C:
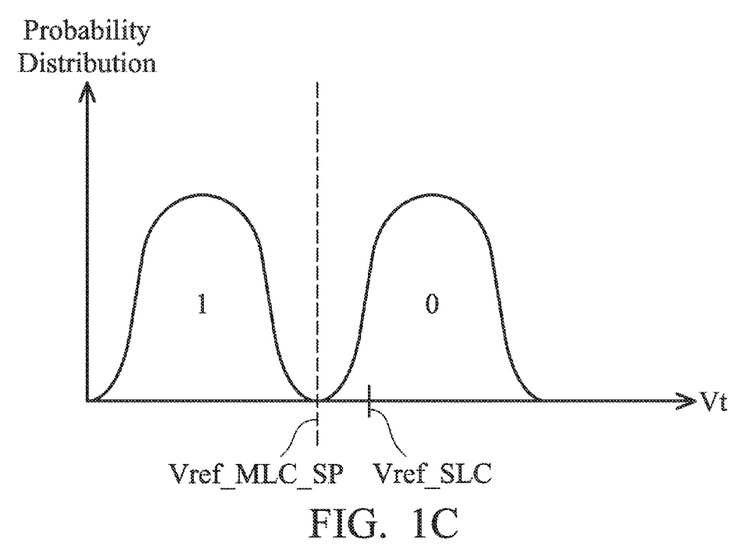
FIG. 1C shows the probability distribution of the different states of a strong paged storage cell, along a voltage axis.

Referring to FIG. 1B, for an MLC, the different two-bit values '00', '01', '10' and '11' are represented by different voltage intervals. Two stages are required for programming a storage cell into a multi-level cell. The first stage is named a strong page stage. The second stage is named a weak page stage. By the strong page stage, a storage cell is transformed to represent a single binary value. By the weak page stage, a strong paged storage cell is further transformed to represent a two-bit value. FIG. 1C shows the probability distribution of the different states of a strong paged storage cell, along a voltage axis. A voltage reference Vref_MLC_SP is adopted to recognize a strong-paged value '0' and a strong-paged value '1'. Note that the voltage reference Vref_MLC_SP is different from the voltage reference Vref_SLC.

In summary, the voltage reference adopted in the data recognition of a storage cell depends on the write operation of the storage cell. To accurately read a storage cell, the voltage reference Vref_SLC is adopted when the storage cell was programmed to be a single level cell. Otherwise, when the storage cell was programmed via the strong page stage for a multi-level cell, the voltage reference Vref_MLC_SP is adopted. However, when a power failure event or a reset process occurs, the mapping between the read and write operations may be disrupted. Accordingly, operation errors may occur.

BRIEF SUMMARY OF THE INVENTION

A data storage device and an operating method for a FLASH memory are disclosed.

A data storage device in accordance with an exemplary embodiment of the invention comprises a FLASH memory and a controller. The FLASH memory provides a storage space which is stored with a first storage type system information and a second storage type system information. Data recognition for the first storage type system information is stricter than that of the second storage type information. The controller reads the storage space of the FLASH memory and performs an error checking and correction process on data read from the storage space and, based on the storage type system information, among the first and second storage type information, which first passes the error checking and correction process, the controller operates the FLASH memory. In this manner, no matter what data recognition criterion is adopted when reading the FLASH memory, correct system information is retrieved.

A FLASH memory operating method in accordance with another exemplary embodiment of the invention comprises the following steps: storing a first storage type system information and a second storage type system information into a storage space of a FLASH memory; reading the storage space of the FLASH memory and performing an error checking and correcting process on data read from the storage space; and, operating the FLASH memory based on the storage type system information, among the first and second storage type information, which first passes the error checking and correction process.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description show several exemplary embodiments carrying out the invention. This description is made for the purpose of illustrating the general principles of the invention and should not be taken in a limiting sense. The scope of the invention is best determined by reference to the appended claims.

Figure 2:
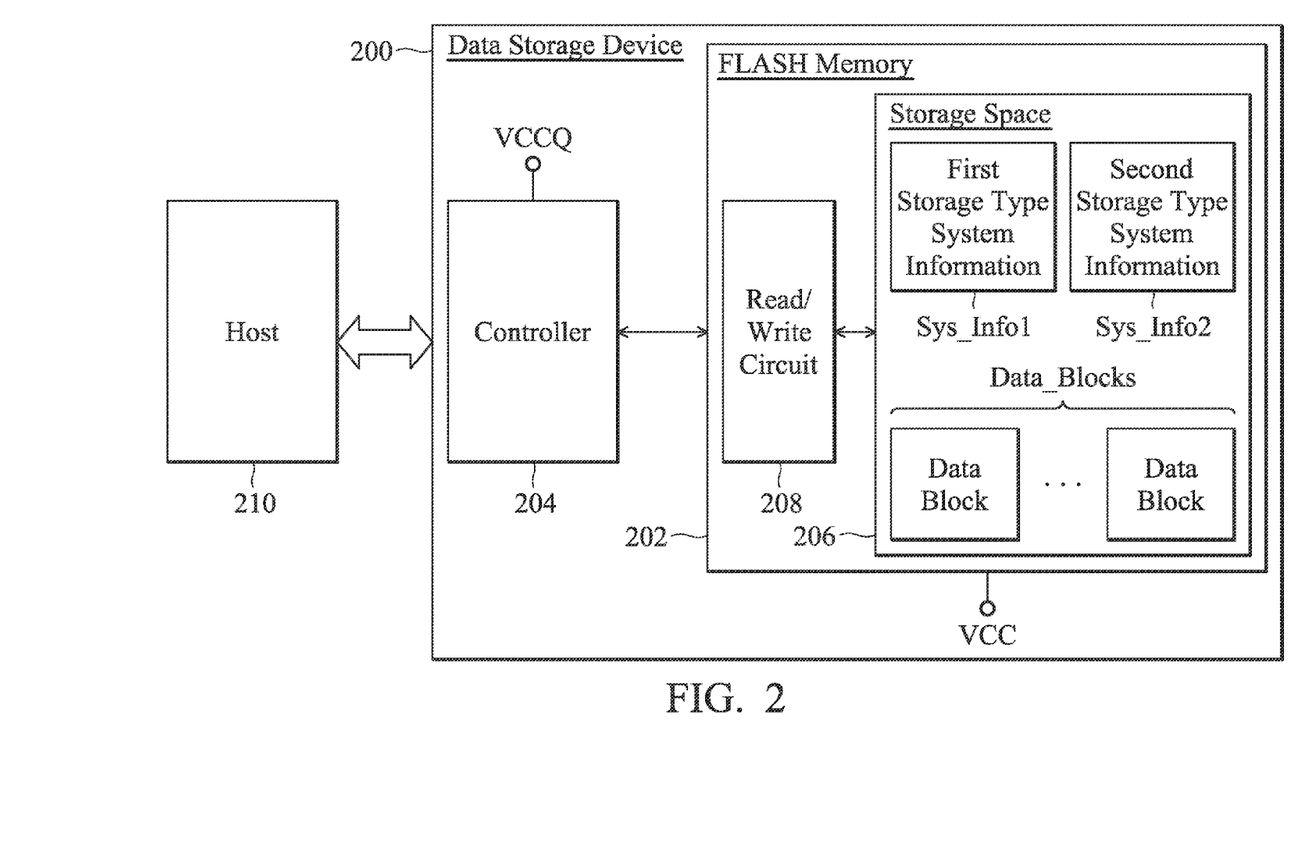
FIG. 2 is a block diagram depicting a data storage device 200 in accordance with an exemplary embodiment of the invention.

FIG. 2 is a block diagram depicting a data storage device 200 in accordance with an exemplary embodiment of the invention, which comprises a FLASH memory 202 and a controller 204. The FLASH memory 202 provides a storage space 206 and comprises a read/write circuit 208. The data storage device 200 may be coupled to a host 210 to operate according to the application executed on the host 210.

Storage cells of the storage space 206 may be implemented by logical gates, e.g., NAND gates and so on. The storage space 206 may include multiple blocks. In addition to the data blocks Data_Blocks, the storage space 206 is stored with a first storage type system information Sys_Info1 and a second storage type system information Sys_Info2. The first storage type system information Sys_Info1 is basic information for operating the FLASH memory 202, like the second storage type system information Sys_Info2. Note that the system information Sys_Info1 and Sys_Info2 of two different storage types are written into the storage space by different techniques. Data recognition for the first storage type system information Sys_Info1 is stricter than that of the second storage type system information Sys_Info2.

The controller 204 may comprise a micro-controller and a read-only memory (ROM) stored with firmware codes. The micro-controller may execute the firmware codes to operate the FLASH memory 202. According to the disclosure, the controller 204 reads the storage space 206 of the FLASH memory 202 (e.g. via the read/write circuit 208) and further performs an error checking and correction (ECC) process on the read data. The controller 204 operates the FLASH memory 202 based on the storage type system information, among the first storage type system information Sys_Info1 and second storage type system information Sys_Info2, which first passes the error checking and correction process.

In this manner, the system information of the FLASH memory 202 is always retrieved no matter what data recognition criterion is adopted. The data storage device 200 works normally no matter what event (e.g., a power failure event, a reset event and so on) occurs.

The read/write circuit 208 is discussed in this paragraph. The read/write circuit 208 may program the storage cells of the storage space 206 by a single level programming technique (corresponding to FIG. 1A) or by a multi-level programming technique (corresponding to FIG. 1B). For the single level programming technique, the read/write circuit 208 programs a storage cell to store a single bit value, and thereby the storage cell is transformed into a single level cell (SLC). For the multi-level programming technique, the read/write circuit 208 programs a storage cell by two stages, including a strong page stage and a weak page stage, and thereby the storage cell is transformed into a multi-level cell (MLC) which stores a multi-bit value. Note that by the multi-level programming technique the storage cell is first programmed via the strong page stage to represent a strong-paged single-bit value and then is further programmed via the weak page stage to represent a two-bit value.

Referring to FIGS. 1A and 1C, the voltage criterion Vref_SLC for the data recognition of an SLC is higher than the voltage criterion Vref_MLC_SP for the data recognition of a strong-paged storage cell. Thus, the data recognition (recognizing value '0' from value '1') for the SLC is more relaxed than that of the strong-paged storage cell. In accordance with an exemplary embodiment of the invention, the first storage type system information Sys_Info1 is programmed into the storage space 206 by the read/write circuit 208 via the strong page stage of the multi-level programming technique, and, the second storage type system information Sys_Info2 is programmed into the storage space 206 by the read/write circuit 208 through the single level programming technique.

In an exemplary embodiment, according to the activation process (e.g. a Mass Production Tool) that the host 210 performs for the FLASH memory 202, the controller 204 operates the read/write circuit 208 to program the first storage type system information Sys_Info1 into the storage space 206 via the strong page stage of the multi-level programming technique. Further, according to the activation process, the controller 204 further operates the read/write circuit 208 to program the second storage type system information Sys_Info2 into the storage space 206 through the single level programming technique.

Figure 3:
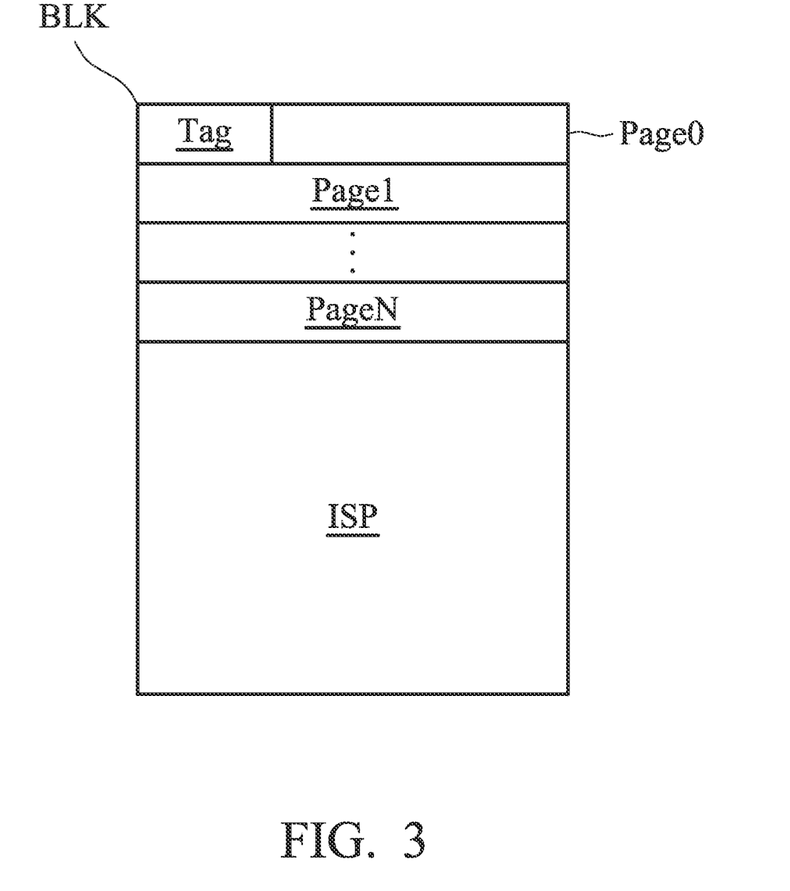
FIG. 3 illustrates the system information architecture in accordance with an exemplary embodiment of the invention.

The architecture of the system information Sys_Info1 or second storage type system information Sys_Info2 is discussed in this paragraph. In an exemplary embodiment, the first storage type system information Sys_Info1 and the second storage type system information Sys_Info2 each occupy a block. FIG. 3 illustrates the system information architecture in accordance with an exemplary embodiment of the invention. As shown, a system information tag Tag is stored in the beginning of the first page Page0 of a block BLK, to mark that the block BLK is stored with system information which is the basic information for operating the FLASH memory 202. In the subsequent pages Page1 to PageN, the physical characteristics of the FLASH memory 202 are stored therein. For example, the physical characteristics may include the physical page size, the bit number designed for the ECC process, a flag showing whether a DDR design is utilized in the FLASH memory 202, the block ranges and so on. In the remaining area of the block BLK, an In-System Program may be stored therein.

An example of power failure events is discussed in this paragraph. As shown in FIG. 2, the controller 204 and the FLASH memory 202 are powered by different power sources VCCQ and VCC, respectively. In a case wherein the power source VCCQ has been broken off but the power source VCC has not, the controller 204 must reread the system information from the storage space 206 in the power restoration process. Meanwhile, the read/write circuit 208 is changed to a particular read strategy (depending on the read strategy before the power failure event of VCCQ, for example, the read strategy may have been changed to the read strategy specified for SLCs, or, may have been changed to the read strategy specified for the strong paged cells.) However, according to the techniques of the disclosure, no matter what read strategy is adopted by the read/write circuit 208, at least one of the first storage type system information Sys_Info1 (programmed via the strong page stage of the multi-level programming technique) and the second storage type system information Sys_Info2 (programmed through the single level programming technique) is capable of passing the error checking and correction process. Thus, no matter what read strategy is adopted by the read/write circuit 208, the controller 204 can retrieve the system information from the storage space 206.

An example of reset events is discussed in this paragraph. The read strategy adopted by the read/write circuit 208 may be adaptive to the manufacturing process vibration of the storage cells. For example, the voltage reference for recognizing value '0' and value '1' may be fine-tuned according to the manufacturing process variations. When the host 210 issues a reset command, the controller 204 has to reread the system information. According to the techniques of the disclosure, no matter how the read strategy is fine-tuned, at least one of the first storage type system information Sys_Info1 and the second storage type system information Sys_Info2 is capable of passing the error checking and correction process. Thus, no matter how the read strategy is fine-tuned, the controller 204 can retrieve the system information from the storage space 206.

Figure 4:
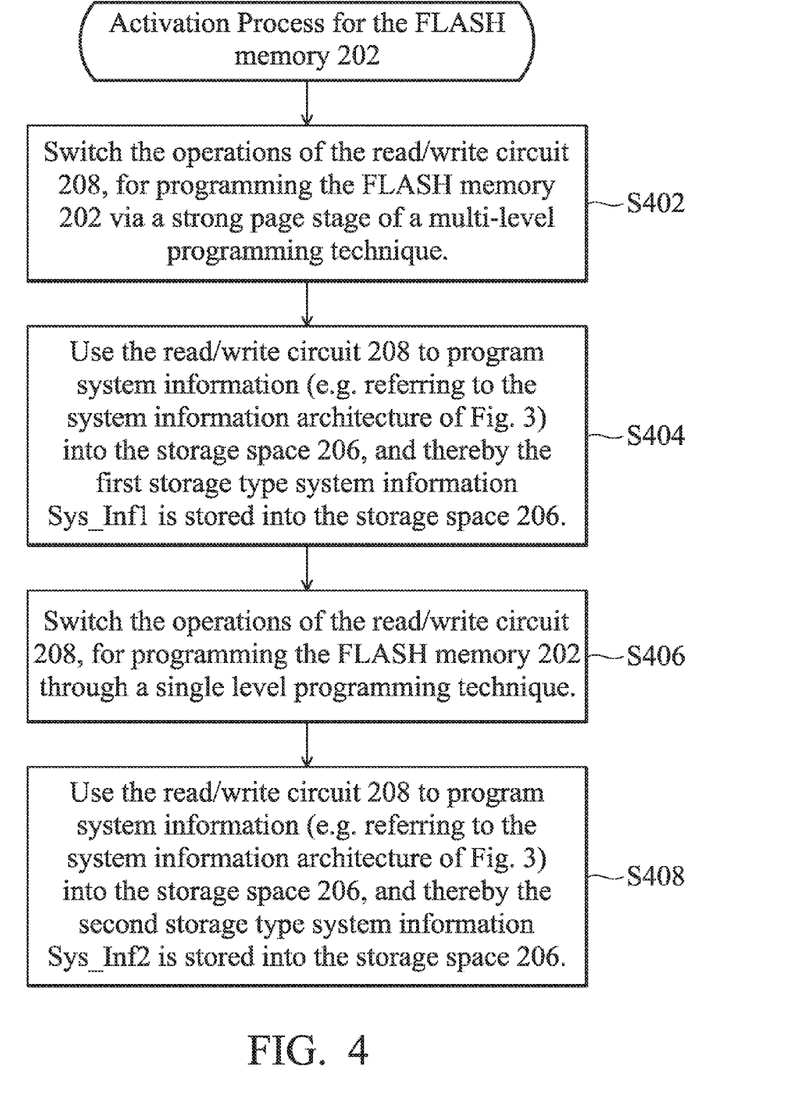
FIG. 4 is a flowchart depicting how the controller 204 operates in response to an activation process that the host 210 performs for the FLASH memory 202.

The operations of the controller 204 are depicted by the flowchart of FIG. 4 in accordance with an exemplary embodiment of the invention, in response to the activation process that the host 210 performs for the FLASH memory 202. In step S402, the controller 204 switches the operations of the read/write circuit 208, for programming the FLASH memory 202 via a strong page stage of a multi-level programming technique. In step S404, the controller 204 uses the read/write circuit 208 to program system information into the storage space 206, wherein the system information may be recorded in an architecture such as that shown in FIG. 3. Thus, the first storage type system information Sys_Inf1 is stored into the storage space 206. In step S406, the controller 204 switches the operations of the read/write circuit 208, for programming the FLASH memory 202 through a single level programming technique. In step S408, the controller 204 uses the read/write circuit 208 to program system information into the storage space 206, wherein the system information may be recorded in an architecture such as that shown in FIG. 3. Thus, the second storage type system information Sys_Inf2 is stored into the storage space 206. Note that it is not intended to limit the write sequence or storage locations of the two different storage types of system information Sys_Info1 and Sys_Info2. In another exemplary embodiment, the steps S406 and S408 are arranged prior to the steps S402 and S404.

Figure 5:
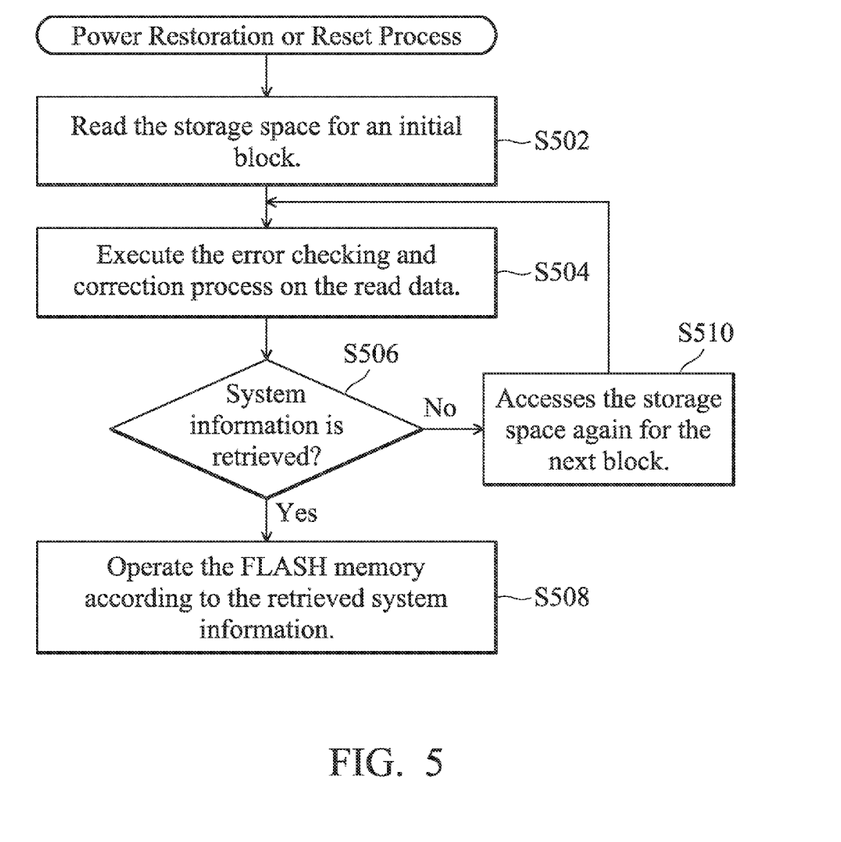
FIG. 5 shows a flowchart depicting the power restoration or reset process of the data storage device 200.

FIG. 5 shows a flowchart depicting the power restoration or reset process of the data storage device 200. In step S502, the controller 204 reads the storage space 206 for an initial block. In step S504, the controller 204 executes the error checking and correction process on the read data. In step S506, the controller 204 determines whether the read data passes the error checking and correction process and thereby determines whether the system information is retrieved. When the system information is retrieved, step S508 is performed and the controller 204 operates the FLASH memory 202 according to the retrieved system information. When it is determined in step S506 that the access for the system information has failed, step S510 is performed and the controller 204 accesses the storage space 206 again for the next block and the steps S504 and S506 are repeated.

The controller 204 may be implemented by a micro-controller executing firmware codes. In another exemplary embodiment, the operations that the disclosed controller performs on the FLASH memory 202 may be performed by a computing system executing software codes, or, may be implemented by software-hardware co-design. The operating methods for the FLASH memory 202 should be considered within the scope of the invention.

A FLASH memory operating method in accordance with another exemplary embodiment of the invention comprises the following steps: storing a first storage type system information Sys_Info1 and a second storage type system information Sys_Info2 into a storage space 206 of a FLASH memory 202; reading the storage space 206 of the FLASH memory 202 and performing an error checking and correcting process on data read from the storage space 206; and, operating the FLASH memory 202 based on the storage type system information, among the two different storage types of system information Sys_Info1 and Sys_Info2, which first passes the error checking and correction process.

In an exemplary embodiment, the first storage type system information Sys_Info1 is programmed into the storage space 206 via a strong page stage that the read/write circuit 208 provides for implementing a multi-level programming technique, and, the second storage type system information Sys_Info2 is programmed into the storage space 206 through a single level programming technique managed by the read/write circuit 208. The programming of the different storage types of system information, such as the first storage type system information Sys_Info1 and the second storage type system information Sys_Info2, may be arranged in the execution of an activation process that a host 210 performs on the FLASH memory 202 (for example, through an MP tool). The system information, such as the first storage type system information Sys_Info1 and the second storage type system information Sys_Info2, may be recorded in the architecture shown in FIG. 3.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
a FLASH memory, providing a storage space storing a first storage type system information and a second storage type system information, wherein, data recognition for the first storage type system information is stricter than that of the second storage type information; and
a controller, coupled to the FLASH memory, reading the storage space, and performing an error checking and correction process on data read from the storage space and operating the FLASH memory based on the storage type system information, among the first and second storage type system information, which first passes the error checking and correction process,
wherein:
the FLASH memory further comprises a read/write circuit;
the read/write circuit provides a multi-level programming technique, by which a storage cell is programmed in two stages for transformation to a multi-level cell, wherein the two stages include a strong page stage and a weak page stage;
the read/write circuit further provides a single level programming technique, by which a storage cell is transformed to a single level cell;
the first storage type system information is programmed into the storage space by the read/write circuit via the strong page stage of the multi-level programming technique; and
the second storage type system information is written into the storage space by the read/write circuit through the single level programming technique.

2. The data storage device as claimed in claim 1, wherein:
the controller operates the read/write circuit in accordance with an activation process that a host performs for the FLASH memory, to program the first storage type system information into the storage space via the strong page stage of the multi-level programming technique; and
the controller further operates the read/write circuit in accordance with the activation process to program the second storage type system information into the storage space through the single level programming technique.

3. The data storage device as claimed in claim 1, wherein the first and second storage type system information each comprises:
a system information tag;
physical characteristics of the FLASH memory; and
in-system codes.

4. An operating method for a FLASH memory, comprising:
programming a storage space of the FLASH memory to store a first storage type system information and a second storage type system information, wherein, data recognition for the first storage type system information is stricter than that of the second storage type information;
reading the storage space of the FLASH memory and performing an error checking and correction process on data read from the storage space and operating the FLASH memory based on the storage type system information, among the first and second storage type information, which first passes the error checking and correction process,
wherein:
the first storage type system information is programmed via a strong page stage of a multi-level programming technique provided by a read/write circuit of the FLASH memory;
the second storage type system information is programmed through a single level programming technique provided by the read/write circuit;
by the multi-level programming technique provided by the read/write circuit, a storage cell is transformed to a multi-level cell in two stages including the strong page stage and a weak page stage; and
by the single level programming technique provided by the read/write circuit, a storage cell is transformed to a single level cell.

5. The operating method as claimed in claim 4, wherein:
in accordance with an activation process that a host performs for the FLASH memory, the read/write circuit of the FLASH memory is operated to program the first storage type system information into the storage space via the strong page stage of the multi-level programming technique; and
in accordance with the activation process, the read/write circuit is operated to program the second storage type system information into the storage space through the single level programming technique.

6. The operating method as claimed in claim 4, wherein the first and second storage type system information each comprises:
a system information tag;
physical characteristics of the FLASH memory; and
in-system codes.

* * * * *